| TIME SEQ. (SEC.) | MSG. SLOT OF GND. STA. | ALTITUDE XMTD (FT.) | RANGE XMTD (NA. MI.) | RANGE RATE XMTD (KNOTS) | WARNING IND. (ARROW) |
|---|---|---|---|---|---|
| 0 | 00-4 & 99-4 | 1000 | 1 | 000 | ▲62 ▼64 |
| 2 | 00-4 & 99-4 | 400 | 1 | 000 | OFF |
| 4 | 00-4 & 99-4 | 1400 | 1 | 000 | ▲ ▼ |
| 6 | 00-4 & 99-4 | 1600 | 1 | 000 | OFF |
| 8 | 00-4 | 600 | 5 | 360 | ▲ |
| 10 | 00-4 | 600 | 7 | 360 | OFF |
| 12 | 99-4 | 600 | 18.5 | 1300 | ▼ |
| 14 | 99-4 | 600 | 25.5 | 1300 | OFF |
| 16 | 00-4 | 1400 | 28.6 | 2060 | ▲ |
| 18 | 00-4 | 1400 | 40 | 2060 | OFF |
| 20 | 00-4 & 99-4 | 1000 | 1 | 000 | ▲ ▼ |

INVENTOR.
WILBUR H. VON FANGE
BY
ATTORNEY

United States Patent Office 3,308,461
Patented Mar. 7, 1967

3,308,461
TEST MEANS FOR ANTI-COLLISION EQUIPMENT AND THE LIKE
Wilbur H. Von Fange, Kirkwood, Mo., assignor to McDonnell Aircraft Corporation, St. Louis, Mo., a corporation of Maryland
Filed Feb. 1, 1965, Ser. No. 429,478
14 Claims. (Cl. 343—17.7)

This invention relates generally to equipment for checking and testing the operation and accuracy of equipment such as collision avoidance and related equipment.

The subject test means are designed primarily to test the operation and accuracy of airborne collision avoidance equipment and the like and to some extent the ground equipment associated therewith. More particularly, the subject means are designed to test systems such as those disclosed in copending Perkinson et al. patent application Serial No. 187,832, filed April 16, 1962, and entitled Synchronizing Means For Remotely Positioned Timing Devices (now United States Patent No. 3,250,-896, issued May 10, 1966); and copending applications Serial Nos. 409,697 and 412,368, all of which are assigned to the same assignee. The patent and pending applications disclose a novel collision avoidance system which includes units installed in aircraft as well as ground equipment that cooperate therewith. The accuracy, dependability and reliability of the systems disclosed in the copending applications in large part are due to the fact that all cooperating units include accurate precision time keeping means which are synchronized with each other in all units and operate on the same frequency. Furthermore, each unit is assigned its own distinct transmission times and this eliminates confusion and interference between the cooperating units and yet enables the system to operate in real time. It also enables the system to continuously update all information without requiring complicated and expensive computers and storage devices.

It is important to the maintenance of the operating accuracy of the systems disclosed in the copending applications that means be provided for quickly and accurately checking out each unit of the system and when necessary locating and correcting faults and troubles without interrupting flight schedules. Many different test devices are in use and some of them may even have application to the subject collision avoidance system. However, so far as known, no one heretofore has devised test equipment specifically constructed to test collision avoidance systems by producing simulated output signals corresponding to the various conditions that the system is designed for. The subject test equipment can therefore be used to make preflight tests of airborne equipment. The subject test equipment can also be used to check the operation of ground stations employed in conjunction with airborne units. Since each airborne unit is assigned individual transmission times, it is important that the subject test equipment operate during time periods that are not assigned in order to prevent interference between the test signals and the airborne units. The simulated test signals transmitted by the test equipment should include information as to range, range rate, altitude and airplane identification, and this information should cover a variety of collision as well as non-collision situations. The controls in the cockpit of the airplanes being tested and the ground station, if desired, will then display the simulated transmissions in a particular manner and sequence which will be readily recognized as a test sequence. Any deviation from the expected pattern will indicate trouble and will also give a clue as to where the trouble is likely to be found. This disclosure should be considered in conjunction with the copending applications for a full understanding of the invention and its operation. It is also important to note that the subject test equipment is designed to test the systems in question without requiring any physical connection therebetween and without requiring any disassembly or complicated test procedure. Furthermore, the test procedure need only be initiated and thereafter it is completely automatic and nothing further need be done unless trouble is indicated.

It is a principal object of the present invention to provide means for dynamically testing a complete collision avoidance system using only the radio frequency link on which the system must depend when airborne.

Another object is to provide relatively simple and inexpensive means for testing and trouble-shooting equipment.

Another object is to provide means for testing the individual operating components of a system without dismantling or otherwise interfering with the system.

Another object is to provide means for testing collision avoidance systems and the like which require little or no skill to operate, and which can be performed in a brief time period as part of a normal preflight procedure.

Another object is to provide means for simultaneously testing the operability of a plurality of collision avoidance systems without shutting down any of the systems or otherwise preventing normal operation thereof.

Another object is to provide means for producing meaningful data from which to determine if each unit of a multi-unit system is functioning properly and if not to indicate which unit or units are failing.

Another object is to provide means for accurately pinpointing trouble in collision avoidance equipment and the like.

Another object is to minimize the amount of equipment required to check for trouble in collision avoidance systems and the like.

Another object is to provide equipment testing means which can be maintained under laboratory conditions at all times.

Another object is to provide means capable of simulating predetermined operating situations that a system being tested might encounter.

Another object is to limit the operating range of test equipment in order to restrict the test area.

These and other objects and advantages of the present invention will become apparent after considering the following detailed specification which covers a preferred embodiment of the subject device, in conjunction with the accompanying drawings, wherein.

Figure 1:
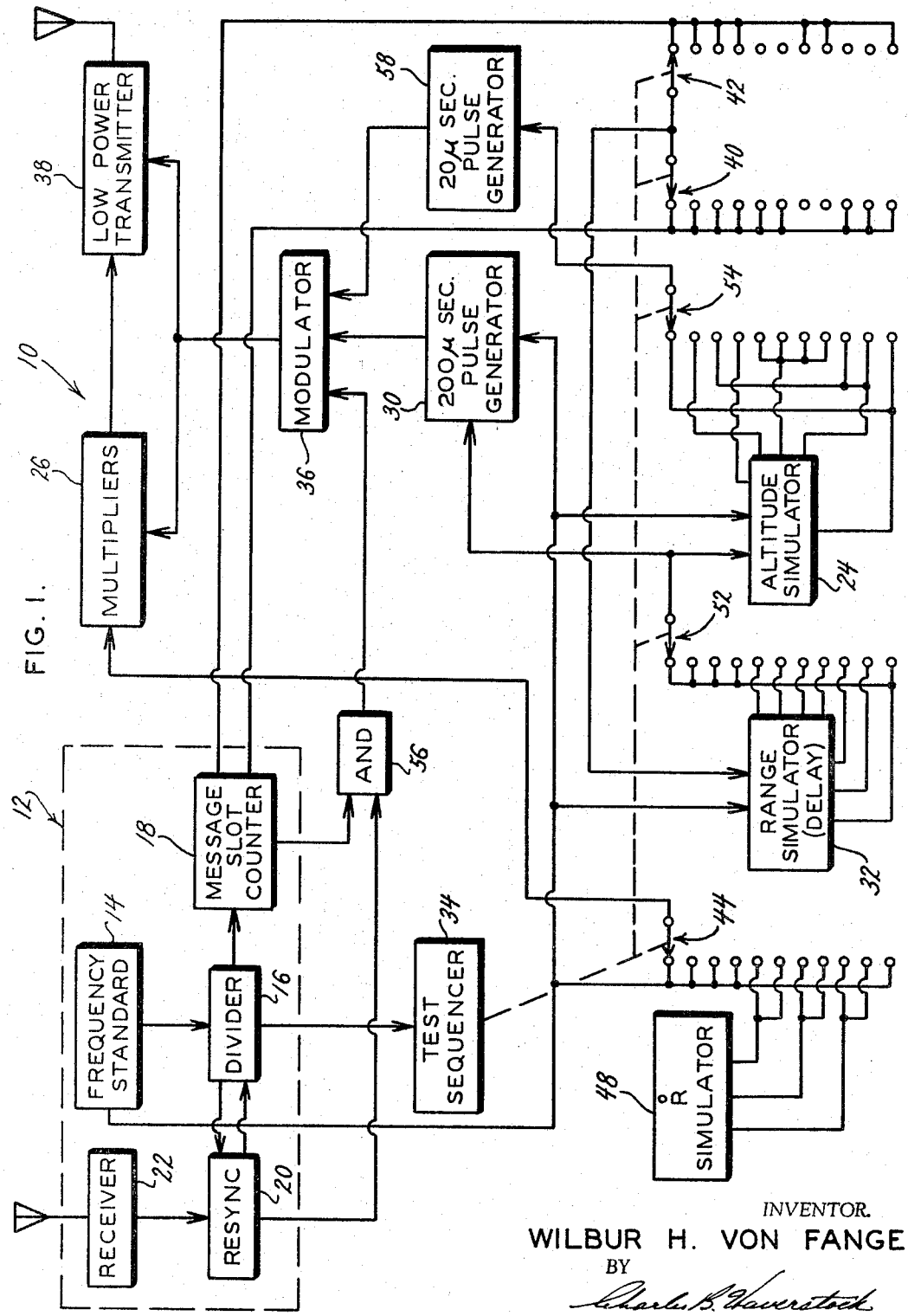
FIG. 1 is a block diagram of the circuit employed in the subject equipment testing means.

Referring to the drawings more particularly by reference numbers, the number 10 refers generally to a circuit shown in block diagram form constructed according to the present invention. The circuit may have certain connections to parts of a ground station 12 such as the ground station disclosed in copending patent application Serial No. 412,368 invented by Messrs. Perkinson et al. The station 12 operates in conjunction with a plurality of airborne stations or units carried by cooperating aircraft within range thereof. A typical airborne unit or system is disclosed in copending Perkinson et al. application Serial No. 409,697. The subject equipment is designed primarily to test the operational and functional characteristics, accuracy and reliability of the airborne units, but may also include means for checking certain operations of the ground station as well.

The portions of the ground station 12 which may be connected to the subject test device include a very accurate oscillator circuit or other time standard 14, a frequency divider circuit 16 which is connected to the output of the time standard 14, a message slot counter circuit 18, and resynchronizing means which include resynchronizing circuit 20 and receiver circuit 22. These ground station circuits provide the subject test equipment with accurate input signals which are used by the airborne circuits for many different purposes including establishing the transmission time periods assigned to each airplane, determining range and range rate between stations, coding and decoding altitude information and so on.

The circuit 10 includes means for dynamically testing collision avoidance systems by producing simulated test signals which are transmitted at precise time periods and which represent various situations which may be encountered in flight. These tests are usually made prior to flight and can be accomplished without attaching any equipment to the airplane and without disconnecting or dismantling any of the airborne equipment unless trouble is indicated. It is also contemplated to use the subject test equipment to test the collision avoidance equipment during flight although this is usually not necessary or desirable. Therefore, since the subject test equipment is normally used to test planes while they are on the ramp, it may be constructed to have relative low transmitting power and it may be constructed to radiate its signals on a time share basis with the master synchronization transmitter at the ground station.

Each aircraft system is constructed to have a test mode capability which allows reception of the time shared test signals during intervals when other signals are not being transmitted and received. The transmitted test signals contain information similar to that normally received from the aircraft except that the test signals are simulated to represent the different situations which may be encountered in flight. These various simulated test signals are programmed to produce a rhythmic or otherwise easily recognizable test pattern presentation in the cockpit if the system is operating properly. If the system is not operating properly then the rhythmic pattern of the test will be broken and this will be easily and quickly detected. The nature of the break in the test pattern will also be useful in locating where the trouble is. The test pattern should preferably also include some means to indicate the beginning and ending of a test sequence. This can be accomplished, for example, by making the first and last test signals of each sequence an unusual or unique cockpit presentations which the operator will always be able to easily identify.

Referring again to FIG. 1, the output of the time standard 14 is shown connected to a range simulator circuit 32, to an altitude simulator circuit 24, to a pulse generator circuit 30, and to a multiplier circuit 26 by way of a stepping switch device portion 44, which will be described later. The frequency divider circuit 16, which is also connected to the output of the time standard 14, is provided to signal the start of each message slot. The frequency divider circuit 16 has an output which is connected to a test sequencer circuit 34 which controls the operation of a plurality of multi-position stepping switches which will be described later. The divider circuit 16 provides an output to the sequencer circuit 34 at the start of each occurrence of a block of message slots which are reserved specifically for test purposes. The sequencer circuit 34 thereafter controls the sequence of the test operations during the assigned test period by controlling the order of occurrence of the simulated test signals, and hence the order in which the different test conditions are presented in the cockpit.

The resync circuit 20 and the message slot counter circuit 18 located in the ground station provide information which is used by a modulator circuit 36 to control the operation of a relatively low power transmitter circuit 38. This is done to synchronize the equipment in each aircraft undergoing test in the test mode. The message slot counter 18 also supplies signals to a stepping switch arrangement which includes stepping switch portions 40 and 42. The stepping switches 40 and 42 receive signals from the message slot counter circuit 18 each time one of the test message slots is reached. The receiver 22 completes the radio frequency link between the test equipment and the aircraft being tested.

The stepping switches employed in the subject test signal generator 10 also have portions other than the portions 40 and 42 as will be described later. All of the stepping switch portions are preferably ganged or connected to operate together and all of the switch portions are advanced commencing at the start of each block of assigned test message slots. Some of the stepping switch portions may also have blank positions for various purposes such as to identify the beginning and ending of a test sequence and to allow a separation between succeeding sequences. The particular stepping switch construction shown and described is an electromechanical device with a limited service life. In an installation involving long periods of unattended operation the function shown would preferably be accomplished by "solid state" switch devices. However, for simplicity of presentation, the ganged stepping switch will be shown in this discussion.

One of the stepping switch portions 44 is used to control the frequency fed to the multipliers 26. In the first portion of the stepping switch portion 44, the frequency standard 14 output is fed directly to the multipliers 26, resulting in a multiplier output frequency which is the equivalent of an airplane exhibiting no closing rate. In other positions of the stepping switch portion 44, outputs of the range rate ($\dot{R}$) simulator 48 are fed to the multipliers 26 to develop output frequencies which are the equivalent of an aircraft exhibiting a closing rate. The magnitude of the closing rate simulated is the result of the frequency generated by the $\dot{R}$ simulator 48. In its preferred state, the $\dot{R}$ simulator consists of three stable but adjustable oscillators which can be set to within a few cycles of the frequency standard 14.

Another stepping switch portion 52 is used with the range simulator circuit 32 to provide an output which is fed to the pulse generator circuit 30 and also to the altitude simulator circuit 24. The range simulator circuit 32 in its preferred form is a counter with sensed time periods brought out to stepping switch portion 52. The sensed time periods correspond to the delay necessary to simulate the range propagation times required in the test sequence. In an actual device 6.18 microseconds equals one mile for this purpose. A delay line or other means may also be used to simulate the propagation times involved. The pulse generator circuit 30 is shown as a 200 microsecond pulse generator and is used to control the time duration of the range pulse. In its preferred state, pulse generator 30 is a counter. A delay line or equivalent may also be used. The pulse generator 30 and the altitude simulator circuit 24 also receive another input from the frequency standard 14 in the ground station.

Another portion 54 of the stepping switch is provided for selecting one of several altitude outputs available from the altitude simulator 24 for actuating the pulse generator 58. The altitude simulator 24 in its preferred form is a counter actuated by the range pulse and is capable of providing a multiplicity of pulse outputs to the stepping switch portion 54. Each pulse is delayed the amount necessary to encode the altitude required in the test sequence. Again, a delay line or other means may be used instead of a counter.

The pulse generator 58 keys the modulator circuit 36 and is shown as a 20 microsecond pulse generator. The generator 58 is used to control the time duration of the altitude pulse and in its preferred state, pulse generator 58 is a monostable flip-flop. The modulator circuit 36 is used to control the transmiter 38 which is preferably a low power limited range transmitter and the multiplier circuit 26.

The stepping switch portions 40 and 42 are provided to control the message slots in which the simulated signals are generated and are fed as another input to the range simulator circuit 32, which in turn controls the altitude simulator 24.

In order for the modulator circuit 36 to control the transmitted outputs, it receives three inputs. One of these is a resynchronizing input from the resync circuit 20 which is fed through an "and" gate 56; a second is from the 200 microsecond pulse generator 30; and the third input is from the 20 microsecond pulse generator 58. The modulator circuit 36 therefore controls the transmission of simulated airborne signals from the transmitter 38 using the same frequency as the system being tested and provided by the multiplier circuit 26.

All of the stepping switch portions 40, 42, 44, 52 and 54 are ganged for operation together and are operated or advanced under control of the test sequencer circuit 34. Each stepping switch portion also has the same number of switch positions although some of the switch positions in the several switch portions may not be used in certain tests depending on the particular conditions being simulated and the sequence of the tests.

Figures 2, 3:
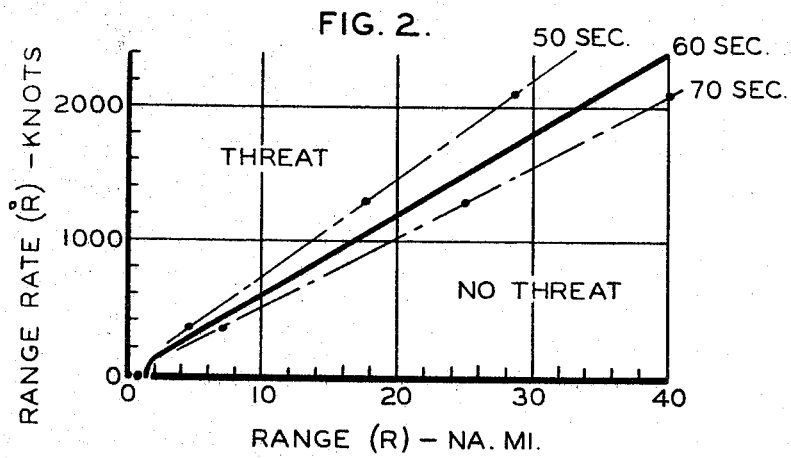
FIG. 2 is a graph of range rate plotted against range to illustrate the operational checkpoints of the circuit of FIG. 1.
FIG. 3 is a chart showing data for a typical simulated test sequence employed by the subject device.

The graph in FIG. 2 is a plot of range versus range rate for all conditions corresponding to sixty seconds to collision or to nearest approach. For all sets of conditions that correspond to a point that falls above the sixty second line, the pilot should receive a warning. For sets of conditions that fall below the sixty second line the pilot should not be warned. The subject test device 10 should be programmed to supply simulated signals in the area above and in the area below the sixty second line shown on the graph (at approximately 50 and 70-second warning times, respectively) in order to produce a variety of cockpit displays and to test as many of the circuits of the collision avoidance equipment as possible.

FIG. 3 is a chart which includes various combinations of data which will produce the conditions to be simulated by the test signals. Eleven different sets of conditions to be simulated in order to produce a particular test sequence are shown. It should be noted that there are also eleven corresponding positions on each of the stepping switch portions as shown in FIG. 1. The number of tests to be performed, however, can be increased or decreased as desired and the particular simulated test conditions shown in FIG. 3 by no means represent the only possibilities but are merely illustrative.

Referring again to FIG. 3, it can be seen that the particular conditions simulated for test purposes produce corresponding cockpit displays as shown in the right hand column. It is preferable to arrange the various displays in an easily recognizable sequence or pattern as a test pattern. This will also enable the operator to more easily identify particular tests in locating troubles. It is usually desirable to allow a period of several seconds between test sequences to prevent confusion as to which is the start of the sequence. If desired the test sequencer 34 (FIG. 1) can be actuated only when an airplane is transmitting in the block of assigned test message slots. Such a control signal would be available at the "and" gate 56.

The first column of the chart in FIG. 3, labeled "Time Sequence In Seconds," identifies succeeding occurrences of the test message slots which slots occur once in every two second time interval. In this case, a block of 100 test message slots is assigned for test purposes and extends from a first test message slot identified as message slot 00–4 to the last test message slot which is message slot 99–4. The final number four (4) identifies these message slots as being test message slots. During the first occurrence of the test message slots, and in the first and last test message slot positions, simulated information is transmitted from the subject test device to an airplane being tested. During these message slot periods, information is transmitted that simulates conditions which will cause both the up warning arrow 62 and the down warning arrow 64 in the cockpit display to be illuminated. The simulated information as to altitude, range and range rate to produce this condition is shown on the chart. The chart of FIG. 3 has been prepared assuming that the elevation of the airfield where the test is being made is 1,000 feet above sea level and that the altitude warning range required to produce a warning display extends from 500 feet above and to 500 feet below the altitude of the airplane being tested. This means that a simulated altitude transmission must be in the range from 500 to 1,500 feet to be able to produce a warning. Since very few airfields are exactly 1,000 feet above sea level, means would normally be provided within the collision avoidance equipment to electrically simulate such an altitude any time the equipment is operated in its test mode.

In the first test therefore the simulated information transmitted by the test equipment includes a coded altitude signal representing 1,000 feet of altitude (the same as the altitude or simulated altitude of an airplane on the ramp), a range signal representing one nautical mile, and a range rate signal representing that the simulated transmitting aircraft is closing on the airplane being tested at a rate of 0 knots per unit of time. Under these simulated conditions both the up and the down warning arrows 62 and 64 will be energized. The arrows will be energized because simulated signals indicate a threatening condition of a proximity range of less than 1.5 miles. The airplane equipment includes means for arbitrarily telling two threatening airplanes at the same altitude to go up and down based on which has the first occurring message slot. Therefore, since the test equipment is transmitting at the beginning and end of the block of test message slots it will be transmitting before and after the message slot assigned to the airplane being tested and hence both arrows will be energized for this test because a co-altitude threat exists. The fact that the test equipment is set up to transmit at the beginning and at the end of the test message slots, therefore, enables this type of dual warning to be produced for test purposes.

The second simulated test is made two seconds after the first simulated test and also includes a signal transmitted in the first and last test message slots. However, the simulated altitude for the second test is 400 feet which is greater than the altitude range required to produce an altitude threat and therefore no warning will be produced in the airplane cockpit.

In the third test which occurs two seconds later both the up and down arrows are again illuminated for substantially the same reasons as for the first test except that in the third test the simulated altitude is 1,400 feet instead of 1,000 feet. Continuing down the chart it can be seen that the other tests are made for other simulated conditions of altitude, range and range rate. Note also that a simulated signal is transmitted only during one test message slot for some of the tests in order to illuminate one of the warning lights.

The controls in the airplane to be tested may include in addition to those controls described above a level off indicating light which is energized during a climbing or diving maneuver to warn the pilot that he will pass through the altitude at which another threatening airplane is flying unless he levels off. The aircraft may also have a light to indicate that its equipment is synchronized, and it may include caution controls which indicate to the pilot the presence of another airplane flying nearby at the same or at a different altitude but not at the moment representing a present threat. Such controls are described in copending application Serial No. 409,697. If such controls are included in the airplane the test equipment should be expanded to include means for testing them. This can be done in the same or similar manner by modifying the simulated signals to produce the conditions required to energize the controls. It is not deemed necessary to describe in detail all of the many possibilities that could be included and tested by the subject system. It should be apparent that the conditions required to produce a warning or caution display can be varied depending upon circumstances.

The test sequencer circuit 34 included in the subject device can also have many different forms. Its main feature, however, is to advance all of the stepping switch portions that are employed a step at a time during each test sequence. For example, if one period of operation is two seconds long the test sequencer 34 will advance the stepping relay one move every two seconds so that each test display will have two seconds. The total test sequence will, therefore, take two seconds time the number of tests to be made which will usually be a relatively short time.

The time periods for each operating cycle as already noted are subdivided into individual message slots for different purposes. One arrangement is to assign certain message slots to a normal operating mode for assignment to individual airplanes, another mode or group of modes are assigned as pack modes for airplanes flying in formation and for other purposes, and another mode or group of message slots is reserved for test purposes known as the test mode. The test mode message slots are the message slots from 00–4 to 99–4 as designated in FIG. 3. This includes all of the message slots in mode 4, for example, message slots 00–4, 01–4, 02–4, 03–4 . . . 99–4. The normal modes would then be 00–0, 01–0, 02–0 . . . 99–0. Other pack modes would be similar but identified as 00–1, 01–1, 02–1, etc., and 00–2 01–2, 02–2, etc., and 00–3, 01–3, 02–3, etc. All of the modes can be expanded or reduced as required.

The following is a description of the operation of the subject test means. It is assumed that at the start of a test the system has been in operation for some time and that a cycle has just been completed. It is also assumed that the test sequencer circuit 34 has advanced to its starting position so that the sequence of tests will be performed in the desired order. It is also assumed that there are five hundred individual message slots in a complete operating cycle with each slot being of two milliseconds duration. Thus each operating cycle will require one second to complete. It is also assumed that the five hundred individual message slots are subdivided into five blocks of one hundred slots each numbered from slot 00 to slot 99 in each block. The blocks in turn are numbered 0, 1, 2, 3 and 4 to denote the five. The one hundred message slots in block 4 represent the test mode in which the subject device operates.

Referring to FIG. 2 of the drawings, the diagonal lines represent different preselected times to nearest approach of 50, 60 and 70 seconds. For the system to be operating properly it must produce a warning at 60±9 seconds to the nearest approach. A series of co-altitude tests along the 50-second diagonal line must definitely produce a warning, and conversely a series of co-altitude tests along the 70-second line should not produce a warning. Also, it is assumed in the write up that a warning must be produced whenever two systems are within one and a half miles of each other and co-altitude conditions exist. For a co-altitude condition to exist the altitude of the transmitting aircraft must be within a band of ±500 ft. of the altitude of the receiving aircraft which in this case is simulated to be flying at 1,000 ft. For the subject test device to operate it is also assumed that the collision avoidance system includes means which determine the direction of the necessary evasive maneuver to avoid collision. When a co-altitude condition exists the selection of opposite evasive maneuvers is controlled by the relative times of occurrences of the message slots of the airplanes involved. For example, the airplane having the lowest message slot assignment (the first message slot to occur) will be arbitrarily directed to go down while the aircraft with the higher message slot will be directed to go up. This is an arbitrary selection. A system based on whether the intruding aircraft is above or below is also possible, and in this case, changes in the scheduling may be necessary to obtain the desired sequence of the maneuvering warning arrows.

Assume that the system has just proceeded through the operational message slots of the first four blocks and has arrived at message slot 00 of the test block (block 4) and is about to begin a test sequence. Under these conditions, reference to FIG. 3 shows that the first test calls for energizing of both the up and down warning arrows. This is achieved by transmitting a threatening condition both in message slots 00 and 99. This test consists of transmitting a co-altitude signal at a simulated range of one mile and with a zero Doppler shift. This corresponds to the first point on the graph of FIG. 2 near the origin of the two scales. The path of the signals are from the message slot counter 18, which signals the start of the test message slots 00 to 99 in the test block 4, and is through switches 40 and 42 to the range simulator 32. The simulator 32 uses the clock pulses of the frequency standard 14 to count a delay equivalent to a range of one mile after which a signal is passed through the switch 52 to the 200-microsecond pulse generator 30, and to the altitude simulator 24. The pulse generator 30 using the signals from the frequency standard 14 also generates a 200-microsecond gate pulse to activate the modulator 36 which then releases the multiplier 26 output and turns on the transmitter 38. The multipliers 26 use the outputs from the frequency standard 14 to produce an unshifted transmission frequency corresponding to zero Doppler shift. In the meantime, the altitude simulator 24 has been counting a delay from the beginning of the range pulse which is equivalent to an altitude pulse position of 1,000 ft. The output of the simulator 24 is fed through switch 54 to trigger the 20-microsecond pulse generator 58 and its output is fed to the modulator 36 which releases the multiplier 26 output and keys the transmitter 38 for transmission of the altitude pulse. If the collision avoidance system is operating properly it would process the first transmission in message slot 00 as a threat. Also the message slot assigned to the receiving set in this case must necessarily occur at a later time in the test message block than message slot 00. Under these conditions, the up arrow avoidance maneuver command would be flashed in the cockpit. The second transmission in the same system test block or cycle occurs in the last test message slot 99 and energizes the down warning arrow in the cockpit because the message slot 99 is necessarily later than the message slot assigned to the airplane being tested. If either or both warning arrows is not energized the collision avoidance unit is not operating properly.

When the collision avoidance unit is in its assigned message slot in the test block it will be synchronized in the usual way such as described in Perkinson et al. Patent No. 3,250,896. The sync pulses for this operation are generated in the resync circuit 20 (FIG. 1) and are combined with pulses from the message slot counter 18 in the "and" gate 56 to activate the modulator 36 and to release the multipliers 26. This operation also keys the transmitter 38.

The next step in the test operation sequence occurs during the succeeding occurrence of the test block and the test that is simulated is controlled by the test sequencer circuit 34 which advances the various switching circuits under its control. During the second test cycle no test signals are transmitted in the particular example shown in FIG. 3 to allow time for the flashing condition produced during the preceding test cycle to die out. During the third test cycle which begins two seconds after the first cycle the transmitted test altitude is shifted to correspond to an altitude of four hundred feet which is outside of the altitude coincidence and therefore no warnin gshould be produced even though the range should happen to fall within the range requirements of one and a half miles which is the arbitrarily established range. If the collision avoidance unit flashes a warning during this test cycle the altitude band is not operating properly. The paths of the signals for this operation are substantially the same as those of the first step except that the altitude simulator circuit 24 provides a lesser delay before triggering the 20 microseconds pulse generator 58.

The third step in the test sequence occurs during the fourth second and in this test an altitude signal is generated which falls within the altitude threat band but 400 ft. above the center altitude which is 1,000 ft. The other conditions for this test are the same as in test 1 and therefore the same warning indications should be obtained in this step as were obtained in the first step.

In the fourth test step which occurs during the sixth second an altitude pulse is generated corresponding to an altitude of 1,600 ft. which is outside of the altitude warning range and consequently no warning is flashed.

In step five the time sequence of the eighth second, the altitude signals are transmitted corresponding to 600 ft. which altitude is within the altitude threat band. This is the first test in which a threat is generated when the simulated distance is greater than the minimum range of one and a half miles. The time to nearest approach is computed by dividing range by range rate which for this test comes out to be equal to 50 seconds for the simulated range of 5 miles. The value of range rate may not be critical for this test. By transmitting the threat in the first message slot, the collision avoidance unit being tested will flash its up arrow if operating properly. The circuit paths for the generation of this test varies from the previous paths only in the source of the signals that are applied to the multiplier circuits 26. For example, the output of the range rate simulator 48 feeds a signal through the switch 44 which when multiplied by the multiplier circuit 26 will be at the transmission frequency but shifted by an amount equivalent to a signal from an actual aircraft that is closing at 360 knots. Switch 52 picks off a delay equivalent to the 5 mile range output from the range simulator circuit 32 for use in the altitude simulator 24 and in the 200 microsecond pulse generator 30. The altitude simulator supplies a further delay through the switch 54 to activate the altitude pulse generator 58.

Step six occurs during the tenth second of the test and is similar to the test in step five except that the range has been increased from 5 to 7 miles thereby changing to the 70 second to collision line in FIG. 2. A properly adjusted system will not flash a warning for this test. The circuits involved in this test are substantially the same as for the fifth step.

Step 7, which occurs during the time sequence of the twelfth second checks a midpoint on the 50 second to collision line of FIG. 2. In this test, the simulated range and range rate have been changed and the signals are also transmitted during the last test message slot in order to energize the down warning arrow of the collision avoidance system.

Steps 8, 9 and 10 covers still different simulated conditions and step 11 is a repeat of the first test step.

The subject test equipment is included as a permanent ground installation with direct or indirect connections to a ground station, or it can be used at a location remote from the ground station or even in an airborne station, if desired. It can also be installed under laboratory conditions. The range of the subject test equipment can be controlled depending upon where it is to be used and how far away the airplanes being tested are located. Usually the subject device will be used to test airplanes before take off and after landing although it can also be used to test airplanes during flight. The subject device has broad application in the field of testing and particularly in the field of testing devices which transmit and receive information between each other and rely on precise time accuracy.

Thus there has been shown and described a novel testing device which fulfills all of the objects and advantages sought therefor. Many changes, modifications, alterations and other uses and applications of the subject device will, however, become apparent to those skilled in the art after considering this specification which covers a preferred form thereof in conjunction with the accompanying drawings. All such changes, modifications, alterations, and other uses and applications which do not depart from the spirit and scope of the invention are deemed to be covered by the invention which is limited only by the claims which follow.

What is claimed is:

1. Means for producing simulated signals corresponding to preselected conditions comprising means for producing and transmitting signals having predetermined frequency, means for modulating said signals to correspond to predetermined conditions, means for controlling the transmission of the modulated signals at preselected times and for changing the modulation of the transmitted signals to produce a preselected pattern of transmitted simulated conditions.

2. The means defined in claim 1 wherein said transmitted signal modulating means includes means for modulating said transmitted signals according to simulated conditions of range, range rate, and altitude.

3. The means defined in claim 1 wherein said signal modulating means have a plurality of outputs corresponding to different simulated conditions, said means for producing simulated signals further comprising multiposition switch means having connections to the said outputs and to the transmitting means, said means for controlling the transmission and changing the modulation serving to control the operation of said switch means to modulate the transmitted signal according to a predetermined arrangement.

4. Means for transmitting periodic signals coded to simulate predetermined conditions comprising transmitting means, means for generating a signal of predetermined frequency for transmission by said transmitting means, said signal generating means including means for establishing recurring time intervals of said transmitted signal, and means for subdividing said recurring time intervals into a plurality of distinct transmission time periods, means for selecting a particular time period in each interval for transmitting, means for modulating said transmitted signal during said selected time periods to simulate different predetermined conditions, said modulating means having a plurality of outputs, and means for controlling which of said outputs is connected to modulate the transmitting means during each selected transmission time periods.

5. Means for modulating a transmitted signal to simulate predetermined simulated conditions comprising transmitting means, means for generating a signal to be transmitted, means for modulating said signal to simulate preselected conditions of range, range rate, and altitude, said signal generating means including means for establishing recurring time periods of the transmitted signal and means for subdividing said time periods into distinct transmitting times at least one of which is selected as the transmitting time during preselected time periods, said means for modulating said transmitting signals being operative during said selected transmitting times to represent different combinations of simulated range, range rate, and altitude conditions.

6. The means defined in claim 5 wherein said signal modulating means includes a first channel for producing a modulation output representing a simulated range, a second channel for producing a modulation output representing a simulated range rate, a third channel for producing a modulated output representing a simulated altitude, switch means associated with each of said channels and connected to the transmitting means, and means for controlling said switch means to produce preselected combinations of simulated conditions for modulating said transmitted signal.

7. The means defined in claim 6 wherein said switch means includes a plurality of ganged together multi-position switch portions.

8. Means for simulating a plurality of conditions for test purposes comprising a circuit including transmitting means capable of transmitting signals at a preselected frequency, means for modulating the transmitted signals according to preselected simulated conditions, said modulating means being capable of producing a plurality of simulated conditions, means for selecting predetermined ones of the simulated conditions for connection to the transmitting means, and means for controlling the times for transmission of the selected simulated conditions.

9. Means for testing units of a collision avoidance system and the like, each unit of said system including means for transmitting and receiving signals of the same frequency to and from other similar units, said signals being coded to include information from which the range, range rate and altitude of each transmitting unit can be determined, each unit also determining from the information it receives if a threatening condition exists and including means for producing an appropriate warning display whenever it is determined that a threatening condition does exist, the improvement comprising means for testing the units of such a collision avoidance system to see if they are operating properly, said test means including means for providing signals coded to simulate predetermined conditions of range, range rate and altitude, and means for transmitting said simulated signals in a preselected order and at preselected times.

10. The means for testing units of a collision avoidance system and the like defined in claim 9 wherein the simulated test signals are transmitted in an easily identifiable test pattern.

11. The means for testing units of a collision avoidance system and the like defined in claim 9 wherein the simulated test signals are transmitted at the same frequency used by the said units being tested.

12. The means for testing units of a collision avoidance system and the like defined in claim 9 including means establishing time periods and specific transmitting times within said periods that occur simultaneously with corresponding time periods and transmitting times in the units being tested.

13. Means for simultaneously testing the operability of a plurality of collision avoidance systems each of which includes means for transmitting and receiving at the same frequency and in simultaneously occurring time periods and each of which is assigned a specific time for transmitting information as to its location, said test means including means for simulating a plurality of conditions for transmitting to the systems being tested for test purposes, said test means comprising a circuit having transmitting means capable of transmitting signals at the same frequency as the systems being tested and at preselected ones of the time periods, means for modulating the transmitted test signals whereby said signals are coded to represent preselected test conditions, said modulating means including means for modulating the test signals to simulate conditions from which the systems being tested can determine the simulated range and range rate transmitted by the test means, and means for transmitting differently modulated transmissions at different preselected time periods.

14. Means for dynamically testing the operation of a collision avoidance system including a plurality of remotely positioned stations each including transmitting and receiving means operating on the same frequency and means for synchronizing the transmitting and receiving means at each station with the transmitting and receiving means at the other stations comprising means for establishing recurring time intervals and for subdividing said recurring time intervals into a plurality of distinct transmission time periods, means for selecting particular time periods in preselected intervals for transmitting test information signals simulating preselected conditions from which the location and changes in location of the test means can be determined, means for transmitting said test information signals over a limited range, means for modulating said information signals produced by the test means during said selected transmission time periods to simulate different predetermined location conditions, said modulating means including means for producing a plurality of different modulating outputs to simulate predetermined conditions as to the altitude of the test means and as to the range and range rate of the test means relative to the stations being tested, and means for effecting different preselected modulated outputs in a predetermined test arrangement during succeeding occurrences of the test transmission time periods to simulate different test conditions.

No references cited.

RODNEY D. BENNETT, *Acting Primary Examiner.*

CHESTER L. JUSTUS, *Examiner.*

T. H. TUBBESING, *Assistant Examiner.*